No. 745,565. Patented December 1, 1903.

UNITED STATES PATENT OFFICE.

GOODWIN BROWN, OF YONKERS, NEW YORK.

VEGETABLE FLOUR.

SPECIFICATION forming part of Letters Patent No. 745,565, dated December 1, 1903.

Application filed April 16, 1901. Serial No. 56,145. (No specimens.)

*To all whom it may concern:*

Be it known that I, GOODWIN BROWN, a citizen of the United States of America, and a resident of Yonkers, county of Westchester, State of New York, have invented certain new and useful Improvements in Vegetable Flours, of which the following is a specification.

My invention relates to the manufacture of flour or meal from pumpkin or squash for use in puddings, &c., and has the object to produce a pumpkin or squash flour or meal which has a fine taste, which can be used without further preliminary cooking, and which will keep for a long time without deterioration.

To prepare the flour or meal, the pumpkin or squash, which latter vegetable is allied to the pumpkin, is cut into small pieces or dice and evaporated or dried. The dried pieces are then coarsely ground—for instance, as fine as bird shot. The ground material is then roasted in a suitable oven or roaster, preferably at as high a heat as can be applied without burning the material. The roasted material is then ground or pulverized finely and packed in packages. The roasting brings out or imparts to the material a rich flavor and a fine color. It also destroys all germ and prevents deterioration of the material for a long time, and it changes the constituents of the material in such a way that the flour or meal is readily soluble and requires no further preliminary cooking, but is practically ready for consumption simply by being baked in a pie or cooked in a pudding.

I claim as my invention—

The herein-described pumpkin flour, consisting of the dried, roasted and ground substance of the pumpkin.

Signed by me in New York city this 19th day of March, 1901.

GOODWIN BROWN.

Witnesses:
GEORGE H. GILMAN,
H. G H. WHITMAN.